US 6,669,976 B2

(12) United States Patent
Fritz

(10) Patent No.: US 6,669,976 B2
(45) Date of Patent: Dec. 30, 2003

(54) SELF-FOAMING SOLUBLE BEVERAGE POWDER

(75) Inventor: Michael Fritz, Orbe (CH)

(73) Assignee: Nestec S.A., Vevey (CH)

( * ) Notice: Subject to any disclaimer, the term of this patent is extended or adjusted under 35 U.S.C. 154(b) by 108 days.

(21) Appl. No.: 09/816,633

(22) Filed: Mar. 23, 2001

(65) Prior Publication Data

US 2001/0024675 A1 Sep. 27, 2001

(30) Foreign Application Priority Data

Mar. 24, 2000 (CH) .......................................... 00106399

(51) Int. Cl.⁷ .................................................. A23F 5/00
(52) U.S. Cl. ...................................... 426/569; 426/594
(58) Field of Search ................................. 426/569, 594

(56) References Cited

U.S. PATENT DOCUMENTS

| 5,141,755 A | 8/1992 | Weisman ..................... 426/42 |
| 5,190,779 A | 3/1993 | Schlecht ..................... 426/434 |
| 5,780,092 A | * 7/1998 | Agbo et al. |
| 5,882,716 A | 3/1999 | Munz-Schaerer ........... 426/591 |
| 5,897,903 A | 4/1999 | Gerhard-Rieben et al. .. 426/433 |
| 5,997,929 A | 12/1999 | Heeb et al. ................. 426/433 |

FOREIGN PATENT DOCUMENTS

| DE | 297 07 107 U1 | 7/1997 |
| EP | 0839 457 A1 | 5/1998 |
| EP | 100 548 A1 | 5/2000 |
| GB | 2 157 939 A | 11/1985 |

OTHER PUBLICATIONS

A. Franck, "Prebiotic sweetners blends", XP002147229, Food & Marketing Technology, Orafti Active Food Ingredients, No. 13, vol. 1, pp. 22–24 (1999).

* cited by examiner

Primary Examiner—Anthony J. Weier
(74) Attorney, Agent, or Firm—Winston & Strawn LLP

(57) ABSTRACT

The invention relates to a soluble coffee beverage powder, which, upon the addition of water, is capable of forming a coffee beverage having a foamed upper surface. The soluble coffee beverage powder includes a soluble gas containing matrix comprising soluble coffee solids and a soluble filler, with the soluble filler constituting at least about 35% by weight of the dry matter of the matrix in order to increase the volume of the soluble coffee beverage powder incorporating gas. A particular preferred filler is an oligofructose that has a good solubility and which positively influences on the taste of the prepared coffee beverage. The invention also relates a soluble coffee beverage powder providing a black foamed coffee. The invention also provides a process for preparing such a soluble coffee beverage powder.

12 Claims, No Drawings

SELF-FOAMING SOLUBLE BEVERAGE POWDER

FIELD OF THE INVENTION

This invention relates to a soluble coffee beverage powder that, upon the addition of water, is capable of forming a coffee beverage having a foamed upper surface. In particular the invention relates to a soluble beverage powder that, upon reconstitution, provides a beverage which closely resembles a freshly brewed coffee. The invention also relates to a process for making such a product.

BACKGROUND TO THE INVENTION

Soluble coffee beverages are well known products, which upon the addition of water (usually hot), provides coffee beverages. It is also well known to mix the soluble coffee powder with soluble creamer or whitener powders to produce whitened coffee beverages. These classical soluble beverage products are coffee beverages without any foam on the upper surface.

Soluble coffee beverage products of the instant "cappuccino" type are also known and are commercially available. Usually these products are dry mixes of a soluble coffee powder and a soluble whitener powder. The soluble whitener powder contains pockets of gas, which, upon dissolution of the powder, produce foam. Therefore, upon the addition of water (usually hot), a whitened coffee beverage, which has a foam on its upper surface, is formed; the beverage resembling, to a greater or lesser extent, traditional Italian cappuccino.

In coffee bars and restaurants, it is usual to serve freshly brewed black coffee which is prepared on the basis of roast and grounds. The freshly brewed black coffee is characterized by a light brown foamy layer that covers the upper surface of the beverage. The coffee is usually prepared on an espresso type machine on which one may for example brew a short strong espresso or a larger cup of black coffee.

None of the existing foaming soluble powders provides a coffee beverage that resembles freshly brewed roast and ground black coffee beverages of the above-described type. This type of freshly brewed espresso is characterized by a light brown foamy layer, which covers substantially all the surface of the beverage.

Thus, there is a need for an alternative to the above-discussed soluble beverage powder and a soluble beverage powder, which upon reconstitution provides a beverage, which closely assimilates a freshly brewed espresso or black coffee.

SUMMARY OF THE INVENTION

The invention provides a soluble coffee beverage powder that, upon the addition of water, is capable of forming a coffee beverage having a foamed upper surface. The soluble coffee beverage powder comprises a soluble gas containing matrix comprising soluble coffee solids and a soluble filler. Advantageously, the soluble filler constitutes at least about 35% by weight of the dry matter of the matrix and is effective to increase the volume of the soluble coffee beverage powder incorporating gas.

It has surprisingly been found that upon the addition of water to the soluble beverage powder of the invention, a foamed black coffee with foam on it upper surface is provided. In texture, color and mouthfeel, the foamed beverage product of the invention has a foam that is comparable to that of a freshly brewed espresso prepared from roast and ground espresso machines.

The high quantity of soluble roamer, at least about 35%, and preferably at least about 45% by weight of the dry matter of the soluble matrix, is effective to increase the volume of the soluble coffee beverage powder into which gas may be incorporated. By increasing the powder volume and thus the amount of gas incorporated in the beverage powder, a product with a higher foam volume may be achieved. Thus, the soluble filler is added for that purpose. This has further the advantage that a high foam volume is more stable than a small one, and results in the foam staying longer on the surface of the beverage.

In a preferred embodiment of the invention, the soluble filler is an oligofructose. It has been found that large amounts of oligofructose may be added without any major impact on the taste profile of the products. Further, it has surprisingly been found that oligofructoses reduce unpleasant coffee notes like acidity, harshness and astringency of the product. This allows a coffee with milder taste profile to be made without the addition of creamer. In addition, oligofructoses have been found to be particular suitable as a soluble filler due to their good solubility and high dissolution velocity.

A preferred product according to the invention is a self-foaming black coffee powder, which is soluble in hot water. After reconstitution, the product forms a layer of foam on the product surface, which foam covers the whole surface of the beverage and which is stable for a significant period of time. The product of the invention may be made substantially free from dairy or creamer components but, if desired, milk components may also be added.

The invention also provides a soluble coffee beverage powder that has a soluble matrix comprising soluble coffee solids and a soluble filler, and a foaming gas. The soluble filler is present in an amount effective to increase the gas incorporation volume of the matrix. Preferably, the soluble coffee beverage powder, upon the addition of water, is capable of forming a black coffee beverage having a foamed upper surface.

In a further aspect, this invention relates to a process for providing a soluble coffee beverage powder that, upon the addition of water, is capable of forming a coffee beverage having a foamed upper surface. This process comprises the steps of providing soluble coffee solids constituting at least about 35% by weight of the dry matter of the powder, providing a soluble filler constituting at least about 35% by weight of the dry matter, the soluble filler being effective to increase the volume of the soluble beverage powder capable of incorporating gas, mixing the soluble coffee solids and the soluble filler with a liquid to a mixture and incorporating gas into the mixture, and drying the mixture into a powder containing gas for foaming the coffee beverage.

DETAILED DESCRIPTION OF THE PREFERRED EMBODIMENTS

Preferred embodiments of the invention are now described, by way of example only. According to the invention, the beverage powder has a soluble gas-containing matrix comprising soluble coffee solids and soluble filler. By combining the soluble coffee solids and the soluble filler in a matrix, the product volume increases allowing more gas to be entrapped. Hence, more air bubbles will be available in the coffee after adding hot water and more foam bubbles will be formed. Furthermore, a homogeneously colored product is obtained. Preferably, the soluble filler constitutes at least about 35% by weight of the dry matter of the matrix to be effective to substantially increase the volume of the soluble coffee beverage powder incorporating gas. Further, it is preferred the soluble gas containing matrix includes at least about 35% soluble coffee solids by weight of dry matter.

Advantageously, the matrix includes from about 35 to about 65% soluble coffee solids and/or from about 35 to about 65% soluble filler by weight of dry matter. Preferably, the matrix includes from about 45 to about 60% soluble coffee solids and/or from about 40 to about 55% soluble filler by weight of dry matter. This allows the gas incorporation to be about double of what could have been entrapped in the coffee solids alone. With soluble filler contents below 35% by weight of dry matter, the reconstituted beverage product may not have a sufficiently foamed upper surface. Above about 65% by weight of dry matter of soluble filler, an off taste of the filler may be imparted to the beverage. When the quantity of filler is modified, the concentration for the finished product (g/150 ml water) is preferably adjusted. The concentration of the coffee dry matter in the cup should preferably be the same for all possible concentrations of filler in the powder.

For the preparation of the beverage powder, the coffee solids are conveniently provided in coffee liquor. The coffee liquor may be obtained using any suitable procedure. Usually, the coffee liquor is prepared by concentrating a coffee extract obtained from a coffee extraction process to the desired coffee concentration. The coffee extract may be produced in the usual manner by subjecting roasted coffee beans to extraction. Any suitable extraction procedure may be used because the choice and design of the extraction procedure is a matter of preference and has no critical impact on the invention. Suitable extraction procedures are described in U.S. Pat. Nos. 5,897,903 and 5,997,929; the disclosures of each of which are incorporated herein by reference thereto. Similarly, any suitable concentration procedure may be used because the choice and design of the concentration procedure is a matter of preference and has no critical impact on the invention. Of course, the coffee liquor may also be prepared by dissolving soluble coffee powder in water to the desired concentration.

The color of the foam is light brown. The avoidance of lumps in the foam depends on the solubility of the powder. A suitable soluble filler is one that has a solubility which is close to that of soluble coffee. Further the filler may conveniently be neutral in taste or it can add some sweetness to the final beverage powder.

The soluble filler is preferably an oligosacchride. Examples of such preferred fillers are maltodextrin and oligofructose. Oligofructose has been found to be particular preferred. Although the oligofructose has no particular foam stabilizing effect, it is perfectly soluble and may be added in an amount of up to 45% (related to dry matter) without changing the cup profile. This means that the powder quantity and volume can nearly be doubled without changing the product in taste and this is the main idea of the addition.

A filler which has been found not to be suitable for the present purpose is inulin, which although it has a foam stabilizing effect is not suitable due to bad solubility and low dissolution velocity. The difference between inulin and oligofructose is the degree of polymerisation DP (number of connected molecules). The DP of inulin lies between 2 and 60, whereas the DP of oligofructose is between 2 and 20. The properties of the two ingredients are different, and oligofructose cannot be replaced by inulin.

Advantageously, the oligofructose has a degree of polymerisation between 2 and 8. A suitable oligofructose may be obtained from Raftilose (Orafti). To minimize the impact on the cup profile, it is desirable that the oligofructose has a concentration of mono- and disaccharides in the range from about 3% to about 7%.

A positive side effect of the high amount of oligofructose is that the beverage of the invention may have a prebiotic effect. A prebiotic effect may possibly be achieved at a daily dose of 6 g oligofructose. This corresponds to a consumption of 3 to 4 cups of beverage a day.

The soluble coffee beverage powder may also include a soluble sweetener; i.e., one that is natural or artificial. Suitable examples include sucrose, fructose, lactose, maltose, saccharin, cyclamates, acetosulfame, L-aspartyl based sweeteners such as aspartame, and the like, and mixtures of these. The amount of the sweetener used will vary depending upon the desired level of sweetness and the strength of the sweetener. For sugar based sweeteners, however, the total amount of sweetener is usually in the range of about 10% to about 25% by weight. The soluble sweetener may also be combined with bulking agents such as maltodextrins and polydextrose; particularly if an artificial sweetener is used. In this case, the total amount of sweetener and bulking agent is usually in the range of about 10% to about 25% by weight; artificial sweetener itself usually comprising less than 1% by weight. For a sweet variety of the soluble beverage powder according to the invention, a more sweet type of oligofructose may also be selected. An oligofructose with up to 45% mono- and disaccharides is particularly suitable for this purpose.

Alternatively, the soluble beverage powder may be dry mixed with sugar. In order to get a homogeneous colored product, brown sugar may dry mixed with the soluble beverage powder. The brown sugar furthermore provides a pleasant complement to the coffee taste.

In a preferred embodiment of the invention, the soluble coffee beverage powder consists of soluble coffee solids and soluble filler and no other ingredients. For example, a mild soluble beverage powder may be made without the need for a creamer component. In this embodiment, the beverage powder conveniently does not contain dairy components that could act as a creamer. It may nevertheless be desirable to add for proteins from milk or other sources to influence the foamability of the product. These additions should however be of a very small quantity to avoid any modification of the coffee color.

To produce the soluble beverage powder, the soluble filler is mixed with a liquid to a solution. The solution is then combined with the coffee liquor. Alternatively, the soluble filler is mixed directly into the liquor. The mixture is heated, for example to above 50° C., and is then mixed to a homogeneous solution. Subsequently, the mixture may be gassed by injecting of a gas such as nitrogen or carbon dioxide into it. The gas is then dispersed within the mixture by means of a dispersing machine and the gassed mixture is then passed onto a homogenizer.

The gassed and homogenized mixture is then spay dried in a conventional manner. The spray dried powder has a matrix comprising the soluble filler and the soluble coffee solids. The spray drying may conveniently take place in a spray drying tower having for example a Schlick spray nozzle. The pressure in front of the nozzle is preferably in the range from 45 to 70 bars and the temperature in the tower is preferably in the range from 85 to 95° C. Subsequent to drying, the powder may be cooled in a fluidized bed cooler and leaves a final sieve with a temperature of 20° C. It is preferred that the tapped specific gravity of the powder be in the range from about 150 to about 250 g/l, more preferred is a tapped specific gravity between about 200 and about 220 g/l. Tapped specific gravity is referring to the gravity of the powder when compressed by vibrating the powder with 100 pushes of 10 mm.

EXAMPLES

Example 1

Preparation of Coffee Beverage Powder

Samples of coffee beverage powder according to the invention is prepared as follows: Conventional coffee liquor of 44 to 46% dry matter is mixed in the ratio 55 to 45 with a solution of oligofructose in 44 to 46% dry matter. The solution of oligofructose is made by mixed in demineralized water and oligofructose powder. The mixture of coffee liquor and oligofructose has a dry matter content of 44 to 46%.

The liquor is first heated to approximately 55° C., then inline mixed with nitrogen (450 nl/h), dispersed in a dispersing machine, homogenized and put under pressure in a homogenizer and is then sprayed into a spray drying tower (approximately 600 kg/h). The pressure in front of the nozzle (Schlick) is approximately 50 bar and the temperature in the tower is 90° C. After drying, the powder gets cooled in a fluidized bed cooler and leaves a final sieve with a temperature of 20° C. The specific weight (tapped) has to be between 200 and 220 g/l.

The powder obtained comprises a matrix of soluble coffee and oligofructose into which gas is incorporated.

Example 2

Preparation of Coffee Beverage Powder

Samples of coffee beverage powder are prepared as in Example 1, except that a mixture of demineralized water and soluble coffee powder replaces the coffee liquor. The dry matter content of the liquor from soluble coffee powder is 25%. The oligofructose is the soluble filler. Oligofructose powder is added to the solution of coffee powder until a dry matter content of 44 to 46% is achieved.

The mixture is gassed and dried as discussed in Example 1.

Example 3

Evaluation

A taste panel evaluates the samples prepared according to Example 1 and 2. The concentration of coffee beverage powder according to the invention is 2.6%. The powder is to be put into coffee cups and hot water should be added rapidly. All particles are drowned. A clean bright foam surface is obtained. Milk can be added, if necessary and the beverage can be stirred without destroying the foam. After the foam formation is finished (30 s), the product is ready for consumption.

The reconstituted samples according to the invention are compared with samples prepared without soluble filler but prepared with the same coffee liquor or soluble coffee powder. A triangle and a cup profile are carried out with the products. In the Triangle test three cups of coffee are presented, one is different from the others and the test panel will have to find out which one it is. In the Cup profile test, two cups of coffee are presented, a reference and a sample and the test panel has to decide if they are different or not, using different defined characteristics like bitter, acid and so on. Cup profiles are always in comparison to a reference.

The triangle test shows that the product with oligofructose is in taste does not significantly different from pure soluble coffee beverage. Only the cup profile show slightly differences in odor- and general taste intensity.

The reconstituted samples according to the invention are compared with freshly brewed espresso prepared on roast and ground in a conventional coffee machine. The coffee beverage according to the invention has light brown foam on the whole surface, which is 5 to 10 mm thick, in a cup having a diameter of 74 mm. The thickness of the foam depends on the diameter of the cup. The foam clearly resembles that of the freshly brewed cup. It remains substantially stable for a period of more than 3 minutes.

What is claimed is:

1. A soluble coffee beverage powder which, upon the addition of water, is capable of forming a coffee beverage having a foamed upper surface, the soluble coffee beverage powder comprising a soluble gas containing matrix comprising soluble coffee solids and a soluble filler, the soluble filler constituting at least about 35% by weight of the dry matter of the matrix in order to increase the volume of the soluble coffee beverage powder incorporating gas.

2. A soluble coffee beverage powder according to claim 1, in which the soluble gas containing matrix includes at least about 35% soluble coffee solids by weight of dry matter.

3. A soluble coffee beverage powder according to claim 1, in which the matrix includes from about 35 to about 65% soluble coffee solids and/or from about 35 to about 65% soluble filler by weight of dry matter.

4. A soluble coffee beverage powder according to claim 1, in which the soluble filler is an oligofructose.

5. A soluble coffee beverage powder according to claim 4, in which the oligofructose has a concentration of mono- and disaccharides in the range of from about 3% to about 7%.

6. A soluble beverage powder according to claim 4, in which the oligofructose is a sweet oligofructose having a DP of between 2 and 20.

7. A soluble coffee beverage powder according to claim 1, in which the soluble coffee beverage powder consists of soluble coffee solids and soluble filler.

8. A soluble coffee beverage powder according to claim 1, which does not contain dairy components.

9. A soluble coffee beverage powder according to claim 1, in which the soluble coffee beverage powder is spray dried.

10. A soluble coffee beverage powder comprising a soluble matrix comprising soluble coffee solids and a soluble filler, which soluble matrix comprises gas for foaming wherein the soluble filler is effective to increase the gas incorporation volume of the matrix and the soluble coffee beverage powder, upon the addition of water, is capable of forming a black coffee beverage having a foamed upper surface.

11. A soluble coffee beverage powder comprising a soluble matrix of soluble coffee solids that includes a foaming gas and a soluble filler in an amount effective to increase the gas incorporation volume of the matrix such that, upon the addition of water, the soluble coffee beverage powder is capable of forming a black coffee beverage having an upper surface that is completely covered by foam.

12. A soluble coffee beverage powder according to claim 11, which does not contain dairy components and wherein the foam is comparable to that obtained from a freshly brewed espresso prepared from roast and ground espresso machines.

* * * * *

UNITED STATES PATENT AND TRADEMARK OFFICE
CERTIFICATE OF CORRECTION

PATENT NO. : 6,669,976 B2
DATED : December 30, 2003
INVENTOR(S) : Fritz

It is certified that error appears in the above-identified patent and that said Letters Patent is hereby corrected as shown below:

<u>Title page,</u>
Item [30], Foreign Application Priority Data, after "Mar. 24, 2000" change "(CH)" to -- (EP) --.

Signed and Sealed this

Thirtieth Day of March, 2004

JON W. DUDAS
*Acting Director of the United States Patent and Trademark Office*